Figure 6:
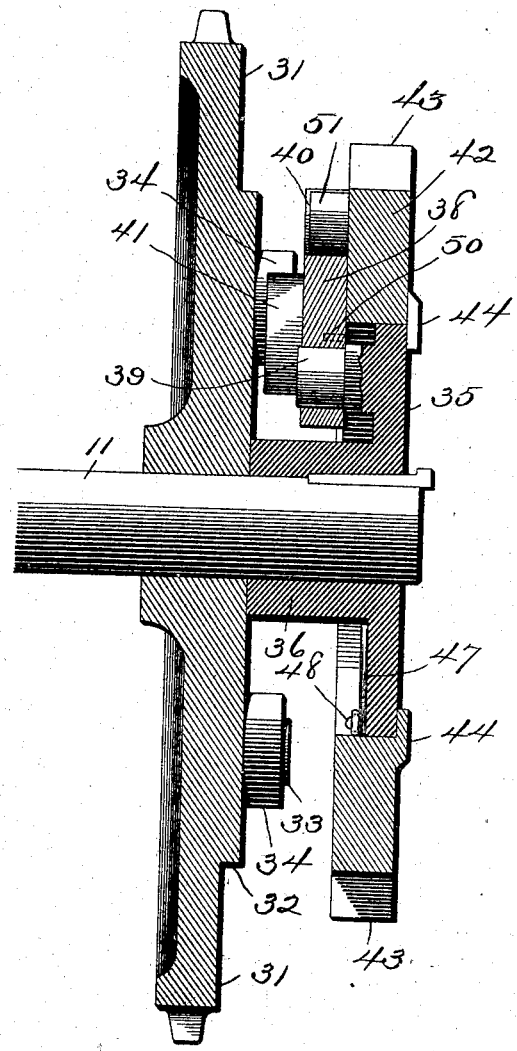

(No Model.)
3 Sheets—Sheet 1.
G. W. PARSONS.
SELF FEEDER FOR THRASHING MACHINES.
No. 605,204.    Patented June 7, 1898.
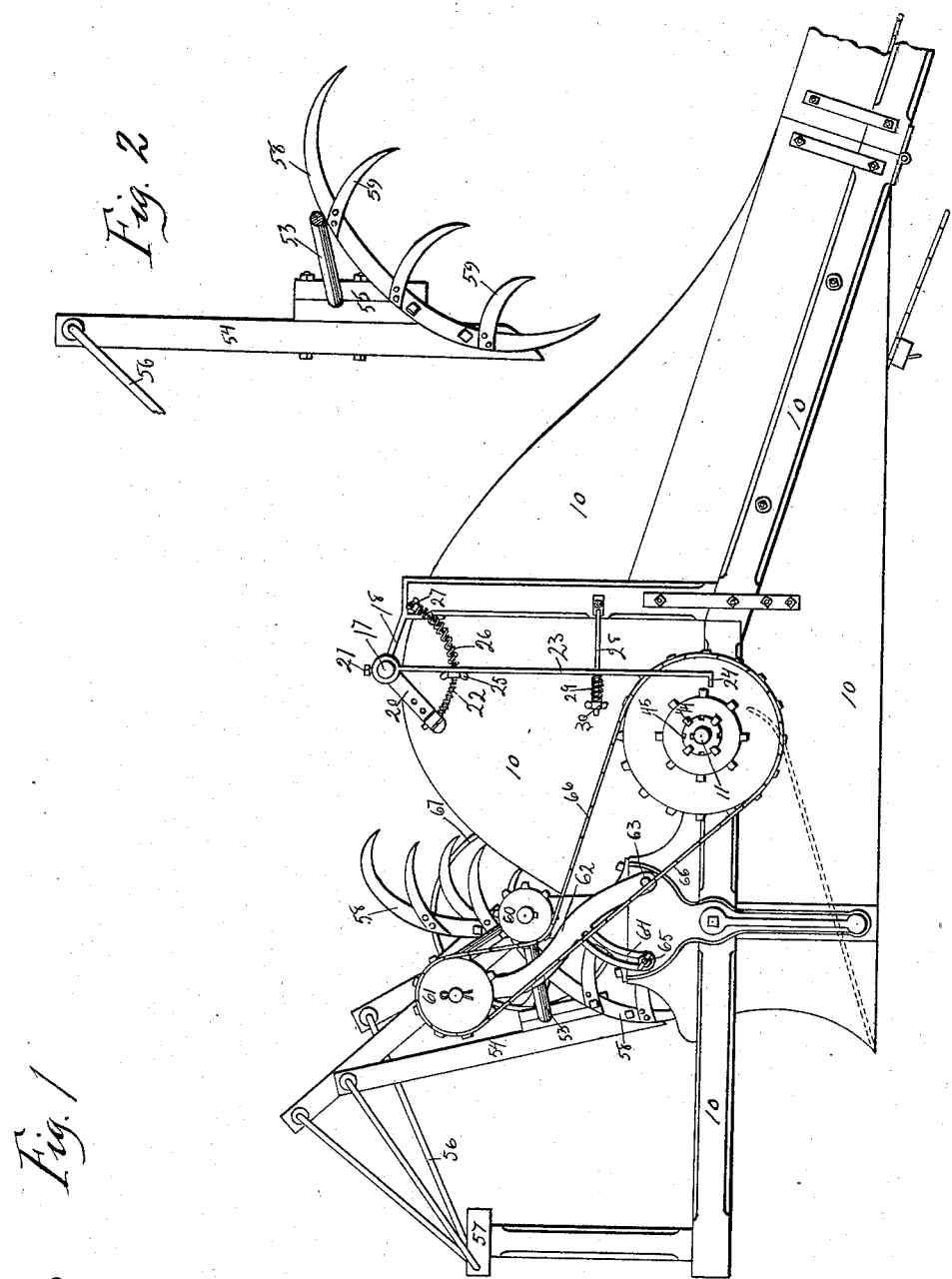

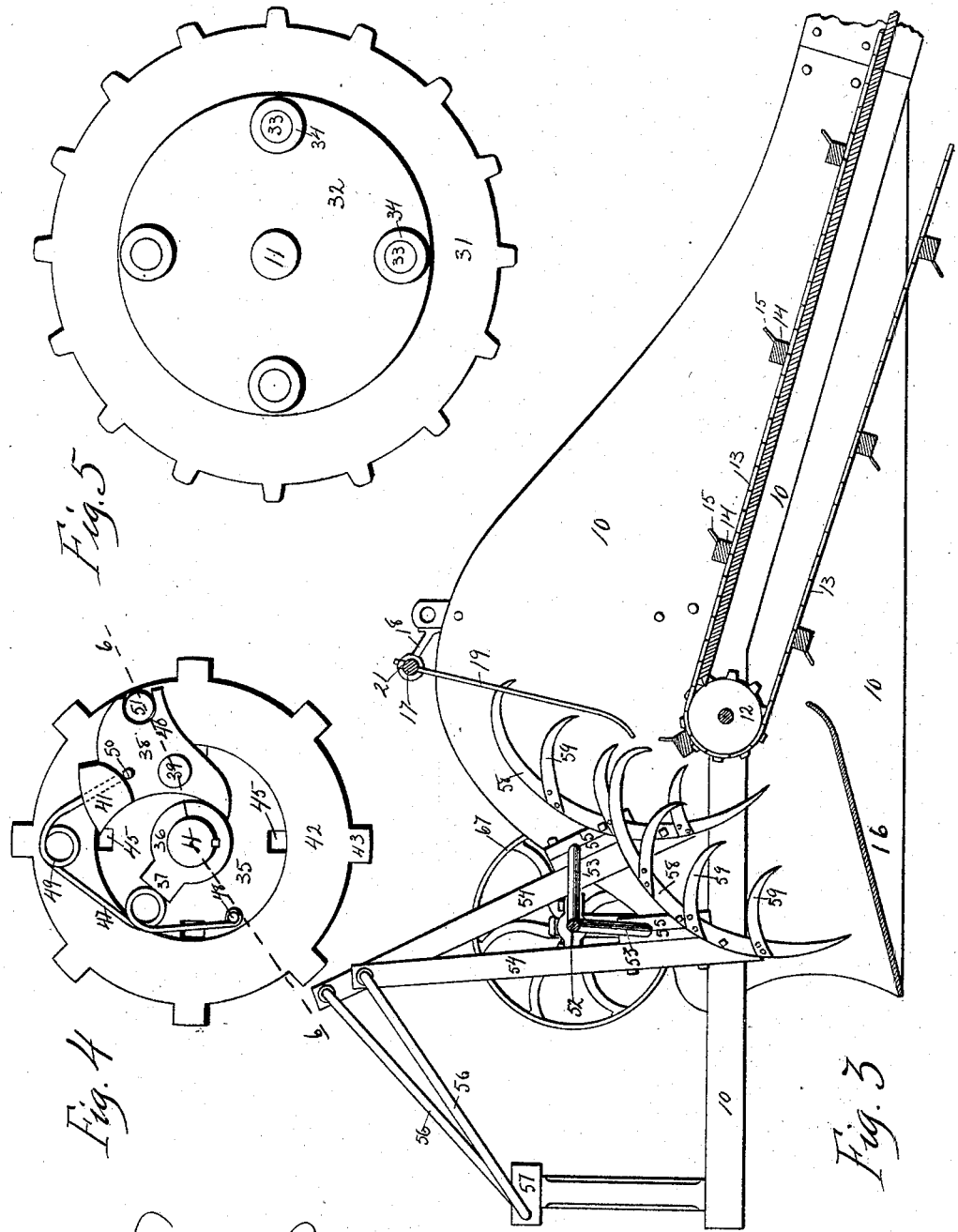

(No Model.)

3 Sheets—Sheet 3.

G. W. PARSONS.
SELF FEEDER FOR THRASHING MACHINES.

No. 605,204.

Patented June 7, 1898.

UNITED STATES PATENT OFFICE.

GEORGE W. PARSONS, OF NEWTON, IOWA, ASSIGNOR OF ONE-THIRD TO FRED SILAS RICH, OF SAME PLACE.

SELF-FEEDER FOR THRESHING-MACHINES.

SPECIFICATION forming part of Letters Patent No. 605,204, dated June 7, 1898.

Application filed May 7, 1897. Serial No. 635,480. (No model.)

*To all whom it may concern:*

Be it known that I, GEORGE W. PARSONS, a citizen of the United States, residing at Newton, in the county of Jasper, State of Iowa, have invented a new and useful Self-Feeder for Threshing-Machines, of which the following is a specification.

This invention relates to that class of self-feeders for threshing-machines in which the grain is moved toward the thresher by means of an endless conveyer and then discharged from the conveyer into a pan or inclined platform which leads downwardly to the threshing-cylinder. Heretofore in machines of this class there have been provided governing devices for controlling the amount of grain that may be fed to the cylinder. Most of said machines, however, have proven defective in that the governing device was located in such a position that the grain on the conveyer would not operate upon the governor until after the same has passed from the endless conveyer, and it is obvious that after the grain has once passed to the pan or inclined platform leading to the cylinder it cannot be prevented from advancing to the cylinder. Hence when a tightly-compressed or wet bundle passed from the endless conveyer it usually passed intact into the cylinder, and thereby overtaxed the capacity of the cylinder.

The primary object of my present invention is to provide means of simple, cheap, and durable construction whereby any large quantities of tightly-compressed or wet grain may be held from passing beyond the conveyer and the conveyer automatically stopped and the said tightly-compressed or wet bundles of grain be separated and fed to the cylinder gradually and as soon as the pressure of the tightly-compressed or wet bundles is removed from the governing device the conveyer be again automatically thrown into operation.

A further object is to provide a governing device that will operate so rapidly when it has engaged a tightly-compressed or wet bundle of grain that the endless conveyer will be stopped almost immediately and the said tightly-compressed or wet bundle be held by the governing device from passing beyond the endless conveyer.

A further object is to provide improved means whereby the governing device may be quickly and easily set or adjusted to operate when any desirable amount of pressure is brought to bear against the trip-rods thereof.

A further object is to provide mechanism of simple, cheap, and durable construction whereby a pressure upon the trip-rods of the governing device will operate to stop the conveyer much more rapidly than has been possible with previous devices of this nature.

A further object is to provide mechanism for conveying grain from the end of the conveyer to the cylinder in such a manner that when a tightly-compressed bundle of grain is held at the end of the conveyer it will be torn apart from its top first and be fed to the cylinder gradually and in such a manner that the parts of a bundle of grain engaged by the cylinder cannot draw any considerable amount of grain into the cylinder, but if any of the parts of a compressed or wet bundle are engaged by the cylinder they will be torn from the remainder of the bundle and the whole bundle will not be drawn into the cylinder.

My invention consists in the construction, arrangement, and combination, in a machine of this class, of a governor having its trip-rods so arranged that when a too great quantity of grain is being fed to the cylinder the trip-rods will hold the surplus quantity of grain and the endless conveyer be automatically stopped before the excessive quantity of grain may pass beyond the end of the conveyer.

My invention consists, further, in certain details in the construction, arrangement, and combination of the mechanism for adjusting the tension of the tripping-rods and the mechanism for throwing the endless carrier in and out of gear.

My invention consists, further, in the construction, arrangement, and combination, with a governing device of this character, of mechanism of simple, cheap, and durable construction for feeding the grain from the endless conveyer to the cylinder in a gradual and uniform manner, and for engaging and conveying to the cylinder the excessive quantity of grain detained by the trip-bars of the governor by beginning at the top of the excessive quantity of grain and forcing the top layer thereof into the cylinder first, and in certain other details of construction, arrangement, and combination of parts whereby the objects contemplated are attained, as hereinafter set forth, pointed out in my claims, and illustrated in the accompanying drawings, in which—

Figure 1 shows a side elevation of the complete machine. Fig. 2 shows an enlarged detail side elevation of one of the devices for forcing grain from the endless conveyer to the cylinder. Fig. 3 shows a vertical longitudinal section of the complete machine. Fig. 4 shows a side elevation of a sprocket-wheel loosely mounted on the shaft of the endless conveyer. Fig. 5 shows a similar view taken from the opposite side of a device to be keyed to the same shaft and to engage with the rollers on the aforesaid sprocket. Fig. 6 shows a transverse sectional view along the shaft 11 through the tripping mechanism fixed thereto. The indicated line 6 6 of Fig. 4 shows the line on which the section is taken of the part shown in Fig. 4.

Referring to the accompanying drawings, the reference-numeral 10 is used to indicate the frame of the machine, which being of ordinary construction, a detailed description is thought to be unnecessary.

The reference-numeral 11 is used to indicate the shaft on which the endless conveyer operates. The reference-numeral 12 is used to indicate the sprocket fixed to the said shaft, over which the sprocket-chains 13 of the endless conveyer run.

14 indicates cross-pieces on the endless conveyer having inclined teeth 15.

The reference-numeral 16 indicates a sheet-metal pan leading from a point beneath the endless conveyer downwardly and rearwardly to lead to the cylinder of a threshing-machine.

The device for holding an excessive quantity of the grain on the endless conveyer and for actuating the tripping mechanism comprises a shaft 17, mounted in suitable bearings 18 to extend transversely across the machine in advance of the rearward turn of the endless conveyer. To this shaft 17 is fixed a series of trip-bars 19 to extend downwardly and rearwardly to a point at such a distance above the endless conveyer that a proper amount of grain may pass under the said trip-bars without engaging them. On one end of the shaft 17 is an arm 20, held thereto by means of a set-screw 21. Fixed to the end of the arm is a segmental rod 22, screw-threaded throughout its entire length.

23 indicates a detent-bar pivoted on the end of the shaft 17 and extended straight downwardly therefrom, with a hook 24 on its lower end to extend rearwardly. This bar 23 has an opening through which the segmental rod 22 is passed, and 25 indicates a thumb-nut mounted on the rod 22 to engage the rear face of the bar 23, and 26 indicates an extensible coiled spring mounted upon the opposite end of the rod 22 and held in position by means of a winged nut 27 to force the spring 26 against the front face of the bar 23.

28 indicates an arm fixed to a part of the machine-frame to project straight rearwardly. An extensile spring 29 is mounted on its rear end, and a winged nut 30 is also mounted thereon to force the spring 29 against the rear face of the bar 23. By this arrangement of springs it is obvious that the tension of the tripping device may be so adjusted that it will take any desirable amount of pressure upon the trip-rods 19 to force the detent-bar 23 rearwardly.

I have provided means whereby the rearward limit of the trip-bar 23 may be controlled and at the same time a rearward movement thereof may be made to quickly stop the operation of the endless conveyer. This mechanism comprises a sprocket-wheel 31, loosely mounted on one end of the shaft 11 and arranged to be constantly driven by power derived from the cylinder of a threshing-machine or in any suitable way. On one face of this sprocket-wheel 31 is a raised disk 32, and on the surface of the said disk are four pins 33, each having an antifriction-roller 34 mounted thereon and all of said rollers arranged at the same distance from the shaft 11 or the center of the wheel.

The reference-numeral 35 indicates a disk keyed to the shaft 11 and having a hub 36 to project inwardly to the disk 32, a lug 37 on said hub, and a trip device 38, pivoted to a pin 39 on the rear face of the disk 35 and extended beyond the periphery of the disk. A pocket 40 is formed in the projecting portion of the trip device 38 in substantial alinement with the center of the shaft and the pin 39. Said trip device has also an enlarged head 41, which may be moved to a position close to the hub 36 or extended outwardly therefrom far enough to enter the circle in which the rollers on the disk 32 are placed and to engage said rollers when so thrown outwardly.

42 indicates a rim having cog-teeth 43 on its periphery.

44 indicates arms formed on the outer surface of the rim to project inwardly beyond the rim, as shown in Fig. 1, and 45 indicates notches on the periphery of the disk 35. The rim 42 is connected with the said disk 35 by passing the projecting arms 44 through the openings 45 and then turning the rim 42 relative to the disk 35 so that the said arms 44 will not coincide with the openings 45.

47 indicates a spring fixed at one end to a pin 48 on the disk 35 and provided with a coil, which is designed to rest against the shoulder 37, and also provided with a coil 49 and having its opposite end 50 inserted in a suitable opening in the end of the trip devices 38, directly beneath the enlarged head 41 thereof.

51 indicates a pin fixed to the rim 42 to enter the pocket 40 of the trip devices 38. The said spring is so arranged as to normally hold the head 41 of the trip devices 38 to its outer limit, so that it will engage with the rollers 34, and this also holds the rim 42 in a position relative to the disk 35 so that the arms 44 will not coincide with the openings 45. This is done through the instrumentality of the pocket 40 and the pin 51.

The practical operation of this tripping mechanism is as follows: The trip-bars 19 are placed in such position relative to the endless conveyer that when a proper amount of grain is passing over the conveyer the said trip-bar will not be moved. When, however, an excessive quantity or a tightly-compressed or wet bundle of grain is carried against these trip-bars, they will be moved rearwardly a slight distance against the pressure of the springs 26 and 29. The trip-bars are then held as against further rearward movement and in this position will serve to hold the excessive quantity of grain and positively prevent it from passing beyond the conveyer. This will immediately throw the detent-bar 23 into engagement with the cog-teeth 43, and the rim 42 will be thereby held from rotation. As soon as this is done the trip device 38 will be moved, by means of the pin, so that its shoulder 41 will assume a position close to the hub 36 against the pressure of the spring 47. When the trip device 38 is in this position, its shoulder 41 will obviously move in a circle inside of the rollers 34 of the sprocket-wheel 31. Hence the conveyer-shaft 11 will not be actuated. As soon, however, as the pressure upon the trip-bars 19 is relieved the springs 26 and 29 will throw the detent-bar 23 forwardly out of engagement with the rim 42. The spring 47 will then operate to throw the trip device 38 outwardly, so that its enlarged head will again enter the path of the rollers 34, and the shaft of the endless conveyer will be again operated automatically.

The reference-numeral 52 indicates a shaft rotatably mounted in suitable bearings on the frame 10 in the rear of the said trip-arms. A number of crank-arms 53 are formed on the shaft 52 to extend in opposite directions.

54 indicates feed-bars having bearing-blocks 55 fixed to their forward surfaces, in which the cranks 53 are mounted. The upper ends of the bars 54 are supported by means of the rods 56, pivoted therein and also to supports 57 at the rear end of the machine-frame. This permits the upper ends of the feed-bars to oscillate. Fixed to the sides of each feed-bar are the curved feeding-hooks 58, the lower ends of which project downwardly beyond the feed-bar 54, so that they will assume a position in proximity to the pan that leads to the cylinder when the feed-bar 54 is at the downward limit of its stroke, and the forward ends of the feed-hooks 58 will assume a position projecting forward between the trip-bars 19 when the feed-bar 54 is at the forward limit of its stroke. Intermediate hooks 59 are fixed to each of the parts 58.

The reference-numeral 60 indicates a sprocket-wheel fixed to one end of the shaft 52, and 61 indicates a sprocket-wheel loosely mounted on the support 62, that is pivoted at 63 to the machine-frame and that is provided with a segmentally-slotted arm 64, through which a clamping-screw 65 is inserted, to be seated in a part of the machine-frame.

66 indicates a sprocket-chain passed over the sprocket-wheels 61 and 31 and under the sprocket-wheel 60. The sprocket-wheel 61 serves the function of an idler and to hold the sprocket-chain in engagement with the under surface of the sprocket-wheel 60 and to take up the slack thereof. The shaft 52 is driven by means of a belt-wheel 67, which is connected with a suitable source of power—such, for instance, as a pulley on the end of a cylinder-shaft.

From the foregoing description it will be readily understood that the feed-bars are operated constantly independent of the endless conveyer, and it will be noted, further, that the grain from the conveyer is engaged by the hooks on the feed-bars and moved toward the cylinder. The lower ends of the said hooks serve to prevent the cylinder from drawing the grain thereinto faster than the said hooks would naturally feed it. Thus the hooks serve not only to advance the grain to the cylinder but to retard it in case there is a tendency of the cylinder to pull it toward the cylinder. Furthermore, when there is an excessive quantity of grain or a tightly-compressed or wet bundle of grain detained on the endless conveyer and in front of the trip-bars 19 the forward end of the hooks 58 will serve to draw parts of this excessive quantity of grain through between the bars 19 and draw them to the cylinder. This operation will thoroughly separate any tightly-compressed bundles or wet grain by drawing it first from the top of the bundle.

Having thus described my invention, what I claim as new therein, and desire to secure by Letters Patent of the United States therefor, is—

1. In a self-feeder for threshing-machines, a device for automatically stopping the motion of the endless conveyer when an excessive quantity of grain is found thereon, comprising in combination, a self-feeder frame, an endless conveyer thereon, trip-bars arranged above the conveyer to be engaged by an excessive quantity of grain upon the conveyer, a detent-arm connected with the said trip-bars to be moved in unison therewith, yielding pressure devices for returning the said detent-arm to its normal position after it has been moved rearwardly by the motion imparted to the trip-bars, a sprocket-wheel loosely mounted on the shaft of the endless conveyer, a series of rollers on one side of said sprocket-wheel arranged at points equidistant from its center, a wheel keyed to the same shaft of the endless conveyer, peripheral teeth thereon to be engaged by said detent-arm when the detent-arm is moved rearwardly, a trip device pivoted to the face of the said keyed wheel and capable of moving outwardly in the path of the aforesaid rollers on the loosely-mounted wheel or of moving inwardly so as not to engage said rollers, a spring for normally holding said trip device outwardly to intercept the path of the said rollers, and means whereby the said trip device may be thrown inwardly so as to not enter the path of the said rollers when the said detent-arm engages the teeth on the periphery of the said keyed wheel, substantially as and for the purposes stated.

2. In a self-feeder for threshing-machines, a device for automatically throwing the endless conveyer thereof in and out of gear, comprising in combination, a self-feeder frame, an endless conveyer thereon, trip-bars pivotally mounted above the endless conveyer to be engaged by an excessive quantity of grain on the conveyer and moved upwardly, a detent-bar connected with the said trip-bars, yielding pressure devices for normally holding the said detent-bar to its forward limit, a sprocket-wheel loosely mounted on the shaft of the endless conveyer, a number of rollers on its outer face at points equidistant from its center, a disk keyed to the same conveyer-shaft and having a number of notches in its periphery, a trip device pivoted thereto and having an enlarged head and a pocket, a spring fixed at one end to the said disk and at its other end to the said trip device, a rim rotatably mounted upon the said disk and having peripheral teeth, a series of projections formed on or fixed to the outer surface of the said rim inwardly over the disk and to be capable of entering the said notches in the disk, and a pin on the said rim to enter the pocket of the trip device, all arranged and combined to operate in the manner set forth and for the purposes stated.

3. In a self-feeder for threshing-machines, the combination of a frame, a conveyer, trip-bars positioned above the rear extremity of the conveyer, mechanism connecting with said trip-bars whereby a rearward pressure upon the trip-bars, such as would be caused by an excessive quantity of grain carried by the conveyer, will operate to retard the movement of the conveyer, means for limiting the rearward movement of said trip-bars so that when at the rearward limit of their movement they will engage and positively hold an excessive quantity of grain from passing beyond the conveyer, for the purpose stated.

4. A self-feeder for threshing-machines, comprising in combination, a frame, an endless conveyer therein, an inclined bottom or pan leading from the rear turn of the conveyer downwardly and rearwardly, a shaft pivotally mounted above the rear turn of the endless conveyer, a series of trip-arms thereon to project downwardly and rearwardly, a detent-bar mounted on the said shaft, an arm fixed to said shaft, a segmental rod fixed to said arm and extended through an opening in the said detent-bar, a yielding pressure device for holding the trip-bars, to their forward limit and for returning them when pressed rearwardly, a sprocket-wheel loosely mounted on the endless-conveyer shaft, a disk fixed to the endless-conveyer shaft and arranged to be engaged by the said detent-bar, mechanism whereby, when the detent-bar is in engagement with the said disk, the sprocket-wheel and the said disk are disengaged, and when the detent-bar is not in engagement therewith the said disk and sprocket-wheel are connected for rotation, a crank-shaft rotatably mounted in the rear of the said trip-bars, a sprocket-wheel fixed to one end thereof, an adjustable idler pivoted to the machine-frame, a sprocket-chain passed around the idler and around the sprocket on the conveyer-shaft and beneath the sprocket on the crank-shaft, means for adjusting the said idler to take up the slack in the chain, a feed-bar pivoted to each of the cranks of the said crank-shaft, a pair of feed-hooks on each of said feed-bars, and rods pivoted to the upper ends of the said feed-bars and to fixed supports in the rear thereof, all arranged and combined substantially in the manner set forth and for the purposes stated.

GEORGE W. PARSONS.

Witnesses:
 W. O. McELROY,
 J. B. EYERLY.